United States Patent [19]
Akashi et al.

[11] 3,930,482
[45] Jan. 6, 1976

[54] FUEL INJECTION PISTON AND METHOD OF ITS MANUFACTURE

[75] Inventors: Tetsuji Akashi, Obu; Takuji Isomura, Toyota, both of Japan

[73] Assignee: Nippondenso Co., Ltd., Kariya, Japan

[22] Filed: Dec. 5, 1973

[21] Appl. No.: 421,827

[30] Foreign Application Priority Data
Dec. 6, 1972  Japan.............................. 47-122936

[52] U.S. Cl. ........................................ 123/139 AR
[51] Int. Cl.² ............................................ F02F 3/28
[58] Field of Search .............................. 123/139 AR

[56] References Cited
UNITED STATES PATENTS

| | | | |
|---|---|---|---|
| 1,966,694 | 7/1934 | Vaudet et al. ................. | 123/139 AR |
| 2,225,019 | 12/1940 | Retel ............................. | 123/139 AR |
| 2,356,511 | 8/1944 | Pocoyrtis ...................... | 123/139 AR |
| 2,696,807 | 12/1954 | Junge et al. .................. | 123/139 AR |
| 2,810,375 | 10/1957 | Froehlich et al. ............. | 123/139 AR |

Primary Examiner—Wendell E. Burns
Assistant Examiner—James W. Cranson
Attorney, Agent, or Firm—Edwin E. Greigg

[57] ABSTRACT

A piston for a fuel injection pump for use in internal combustion engines and its method of manufacture is described. The piston is reciprocated and rotated within a cylinder having a fuel supply opening. The piston has an upper control edge determining initiation of fuel injection and a lower control edge determining initiation of fuel injection and a lower control edge determining termination of fuel injection as the edges move past the fuel supply opening. In its improvement the piston is manufactured to provide a notch in its upper end surface which, at the intersection of the notch with the circumferential surface of the piston, forms at least two upper control sections serving at least as a part of the upper control edge. The two control edge sections have relatively different inclinations with respect to the upper end surface of the piston which effects the fuel injection.

11 Claims, 10 Drawing Figures

FUEL INJECTION PISTON AND METHOD OF ITS MANUFACTURE

BACKGROUND OF THE INVENTION

The present invention relates to fuel injection systems, and more particularly to the pistons used in fuel injection systems to inject fuel to internal combustion engines. Such pistons must provide accurate timing of fuel injection, and must accurately control the amount of fuel being injected.

Pistons of the type to which the invention relates are axially movable over a predetermined distance within their cylinder housings in order to develop an injection pressure. In addition, these pistons are also rotatable within their cylinder housings. The pistons are formed with control surfaces which, together with other surfaces of the piston, provide defined control edges. The control edges, upon coincidence with the limits of fuel supply or upon coincidence with fuel passages in the cylinder, determine the timing of supply of fuel, and, consequently, the quantity of fuel being supplied to the piston and ultimately to the internal combustion engine. Hence, by rotating and axially displacing the piston within the cylinder not only results in developing an injection pressure, but additionally provides for a control function of the fuel quantity being injected.

Known pistons of the type under consideration have previously been manufactured by surface-working the surface of revolution of the piston, usually by milling and grinding.

Minimum toxic exhaust emission from internal combustion engines requires accurate control of the amount of fuel being injected with respect to the amount of air being introduced into the engine, so that the exhaust gases will have a predetermined composition, and typically small noxious components. Accuracy of control of the injection period, and of the injection quantity, with respect to engine operation is demanded by the increasing requirements placed on the operation of the engine, in order to reduce emission of noxious gases. It is, therefore, no longer feasible to provide a straight, or helical control edge on the injection piston to control the admission of fuel to the engine cylinder. The usually used methods of manufacturing such pistons for use in fuel injection systems could not provide control edges which are accurately located with respect to fuel inlet positions in the cylinder within which the piston operates, that is, which have sharp, clearly defined control edges, of changeable direction with respect to the piston inlet openings. Manufacture of such control edges is particularly difficult if the control edges are to have an angle which is less than 180° with respect to each other, that is, if they are to present a convexly curved shape.

Pistons customarily used in fuel injection systems usually have control edges of rather simple shape or direction. Accurate manufacture of a control edge with accurately predetermined relative position with respect to a given point in the piston has previously not been required since the complicated fuel injection timing characteristics are more recent requirements, due to the more recent emphasis on reduced exhaust emissions and, more importantly, it has not been found possible to manufacture control edges of complicated shape or direction on a piston by using the customarily utilized tools and working the circumferential surface of the piston.

In order to work the piston to form a control edge, it has previously been proposed to first form the control edge, and then to subject the piston to a circumferential grinding or polishing process. A second control edge is then cut into the piston which determines the end of the fuel injection sequence or cycle. Thereafter, a longitudinal bore is formed in the piston, or a groove is formed in the circumference thereof which forms a fluid communication channel or duct in order to provide a drain opening from the second control edge. Typically, the drain opening, that is, the fuel duct connects the space beneath the lower control edge with the space above the end face of the piston, that is, the effective pumping or working chamber. It was necessary to first form the upper control edge, and then grind the circumference of the piston. In order to then hold this accurately ground and polished piston for further working thereon, that is, to form the lower edge, it was necessary to hold or secure the piston at the end faces or edges thereof in order not to damage the highly polished and ground outer surface thereof. This, then, required working of the piston such that the upper control edge could be made only at the outer edge of the upper end face of the piston.

OBJECTS AND SUMMARY OF THE PRESENT INVENTION

It is, therefore, an object of the present invention to provide a novel method of making a piston, and to a novel resulting piston construction in which complicated fuel injection relationships, with respect to rotary position of the piston (and, hence with respect to control timing) can be maintained and even improved, and which is simple, results in a piston which is easily made, yet accurate and meets requirements of even the most sophisticated fuel supply system.

This and other objects are achieved according to the present invention by the provision of a piston which is formed in its upper end surface with a groove, or notch, the groove or notch having lateral surfaces of different inclination with respect to the end face of the piston. In accordance with a feature of the present invention, the groove or notch is simply cut by moving a cutting tool transverse to the axis of the piston. After formation of the groove or notch with the differentially inclined surfaces, the piston can then be held, for example, in a centering bolt which engages in a bore formed axially in the piston. The bore preferably extends inwardly of the piston from the outer end surface thereof, which is already cut with the groove or notch. This centering bore is preferably a blind cylindrical bore, of such depth and diameter that at least a portion thereof can serve as the communication duct between the upper control edge and a groove formed in the circumference of the piston, the intersection of the groove with the circumference forming a lower control edge.

Various, especially linear, relationships of quantity of fuel being injected by the piston with respect to the rotary position of the piston in a cylinder can be obtained by controlling the termination of the injection, as determined by the lower control edge formed by the transverse groove in the piston. This lower control edge can have a bent, or angled direction, formed of various portions of a single continuous groove.

BRIEF DESCRIPTION OF THE DRAWING

The invention will be described by way of example with reference to the accompanying drawings, wherein:

FIGS. 8 and 9 are schematic illustrations showing sequential steps in the manufacture of the piston, in which FIG. 8 illustrates cutting of the upper end face of the piston to form the upper control edge, and FIG. 9 is a schematic illustration of holding the piston for surface grinding and polishing.

DETAILED DESCRIPTION OF THE PREFERRED EMBODIMENTS

Figure 1:
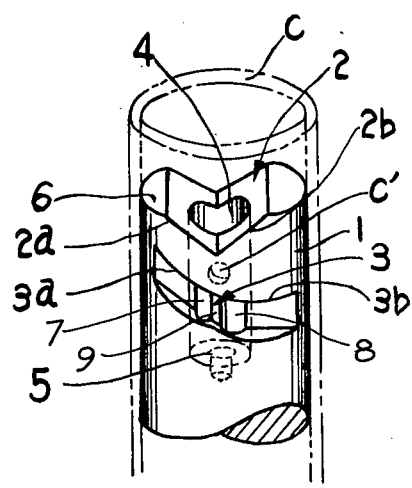
FIG. 1 is a perspective view of a piston in accordance with the present invention, shown within a cylinder which is represented in double chain-dotted lines.

The piston of FIG. 1 is fitted into a cylinder, shown in double chain-dotted lines, and adapted to be reciprocated in a cylinder $c$ by reciprocating drive elements (not shown), known in the art. In addition to reciprocating the piston 1 to provide the operating injection stroke, the piston 1 can also be rotated within the cylinder $c$ in order to control the amount of fuel, or the fuel injection timing, with respect to the piston stroke. The cylinder $c$ has a bore $c'$ formed therein in order to supply fuel to the interior of the cylinder. The bore $c'$, which is connected to a fuel supply, simultaneously forms the suction as well as the return flow bore. Fuel is sucked in by the piston 1 and conducted to an injection nozzle (not shown) under pressure.

The piston 1 has an upper end surface 6, in which a V-shaped notch is cut in the radial direction from the outer surface towards the central axis of the piston. The notch, generally indicated at 2, defines two upper control edges $2a$ and $2b$ at the intersection of the notch 2 with the surface of the piston 1. The first control edge portion $2a$ is inclined downwardly from the upper end surface 6, while the second control edge portion $2b$ extends upwardly, in the opposite direction from the bottom apex of the notch to the upper end surface 6.

The piston 1 is further provided with a circumferential groove 3, which is cut into the circumference surface of the piston. The upper edge of the groove 3, at its intersection with the outer circumferential surface of the piston 1, forms the lower control edge. The shape of the lower control edge is so selected that it is angled, that is, it is formed by two control edges $3a$, $3b$ which form an angle with each other. The control edges $3a$, $3b$ lie beneath and correspond to the control edges $2a$, $2b$. A central bore 4 extends axially from the upper end surface 6 into the piston 1 to form a blind bore therein. The bore 4 is in communication with the groove 3, so that the space beneath the control edges $3a$, $3b$ is in fluid communication with the upper end surface 6. A centering bore 5 is drilled into the piston 1 to extend the bore 4. The bore 5 serves to center the piston 1 during manufacture thereof, as will be described in greater detail below.

Figure 2:
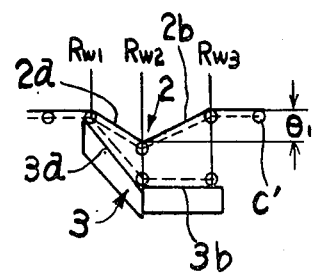
FIG. 2 is a diagram of the control edges of the piston of FIG. 1 in developed view.
Figure 3:
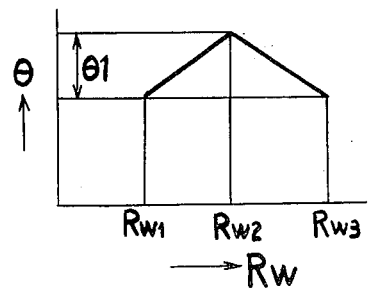
FIG. 3 is a diagram illustrating the injection timing characteristics of the piston of FIGS. 1 and 2.

The operation of the piston 1 shown in FIG. 1 can be better understood by the following description viewed in conjunction with FIGS. 2 and 3. The piston 1 is reciprocated within the cylinder $c$ by a known reciprocating mechanism as stated above. Additionally, a controller (not shown) connected to the piston rod (also not shown) can rotate the piston 1 about its central axis. Rotation of the piston 1 changes the relative position of the upper end surface 6, and hence the relative position of the notches in the upper end surface 6 and the inlet opening $c'$ in the cylinder $c$, and also the relative position of the inlet opening $c'$ with respect to the groove 3 and hence the lower control edges $3a$, $3b$. Rotating the piston 1 thus changes the timing or period of the fuel injection by changing the relative position at which the piston notch, or groove edges pass the opening $c'$. Additionally, the quantity of fuel being injected is likewise determined or controlled by the rotary position of the piston 1 with respect to the cylinder $c$, that is, with respect to the opening $c'$ within the cylinder. The initiation of fuel injection, that is, the instant of fuel injection is determined by the time when the respective upper control edge portion $2a$ or $2b$ closes off the opening $c'$ upon upward movement of the piston 1. Fuel injection is terminated when the respective lower control edge portions $3a$ or $3b$ reach the opening $c'$, that is, when the lower edge portions $3a$ or $3b$ again open the connection to the fuel supply bore $c'$. FIG. 2 illustrates, in developed form, the curves of the various portions of the control edges $2a$, $2b$ and $3a$, $3b$ with respect to the opening $c'$. The positions of the piston with respect to the opening are indicated at $Rw1$, $Rw2$ and $Rw3$, with respect to the external circumference of the piston 1.

The diagram of FIG. 3 illustrates the fuel injection timing instant $\theta$. This characteristic is ascending to a peak and then descending as a function of piston rotation. The injection instant $\theta$ is indicated along the ordinate, with respect to the rotary path of control (in developed form), and $Rw$ is indicated along the abscissa. As can be seen from FIGS. 2 and 3, the control edge portion $2a$ controls the fuel injection timing. Upon changing of the rotary position of the piston 1 from $Rw1$ to $Rw2$ about the timing $\theta1$, injection will be delayed, or retarded to a later injection timing. Upon further rotation of the piston 1 to the position $Rw3$, the injection is again advanced by the same amount $\theta1$.

Figure 4:
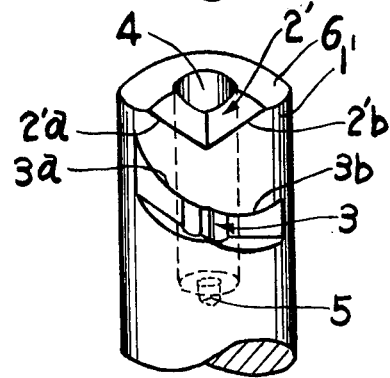
FIG. 4 is a perspective view of another embodiment of a piston.

In the embodiment of FIG. 4, the piston $1'$ differs from the piston 1 of FIG. 1 by a different shape of the notch or groove formed in the upper end surface 6 of the piston. The notch $2'$ is inclined forwardly from a central axial point of the piston $1'$. The two control edge portions $2'a$ and $2'b$ of FIG. 4 correspond essentially to the control edge portions $2a$ and $2b$ of FIG. 1. The machining of the cut or notch $2'$ in this exemplary embodiment is effected by advancing the cutting tool obliquely with respect to the central axis of the piston $1'$. The control edges $2'a$ and $2'b$ will have the same edge relationships with respect to the operation as the edges $2a$, $2b$ of FIG. 1, so that the developed diagram of FIG. 2 and the injection timing diagram of FIG. 3 are equally applicable to the embodiment of FIG. 4.

Figure 5:
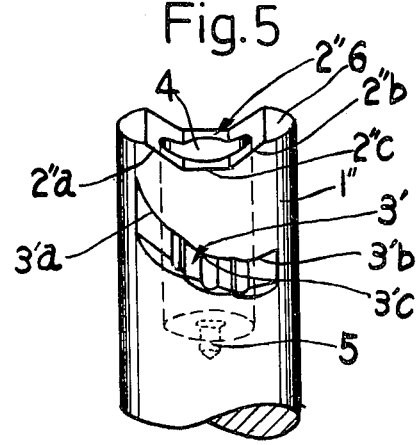
FIG. 5 is a perspective view of a third embodiment of a piston.

In the embodiment of FIG. 5, the notch or groove $2''$ formed in piston $1''$ has the form of an inverted trapezoid. Three control edges will thus be formed, $2''a$, $2''b$ and $2''c$. The control edges $2''a$ and $2''b$ have a similar degree of inclination as the control edges 2a and 2b of FIG. 1, or 2'a and 2'b of FIG. 4. These control edges are connected by a third control edge 2"c which is essentially parallel to the upper end surface 6 of the piston 1". It may be inclined, however, for example just slightly inclined. The lower control edge of the piston 1" is formed by three portions of a groove 3' worked into the circumferential surface of the piston 1", to form three portions 3'a, 3'b and 3'c. These three portions have an extent and direction which is angled similar to the direction of inclination of the upper control edges, but with a different degree of inclination, or a different angle. This difference in angle, or degree of inclination, provides for changing the quantity of fuel being supplied upon changing the rotary position of the piston 1" with respect to the inlet opening c' of the cylinder. The relationship of the change in fuel quantity, and injection timing, with respect to the rotary position of the piston is essentially linear in all three embodiments, although the upper control edge formed by the notch 2, 2', 2", respectively, has inclined portions.

The shape of the notches or grooves 2, 2' or 2", and the direction of the grooves 3, 3' need not be straight, but can be bent or bowed, or bulged. The tool which makes the grooves or cuts can be given a suitable shape to provide this shape of the notch or groove cut in the upper end surface of the piston, to form the control edges in the desired shape.

If the groove 3 or 3' is of insufficient depth to be intersected by the bore 4, a communication duct can be drilled from the groove 3 to communicate with the bore 4 or an outer groove can be cut into the piston to form a fluid communication duct between the groove 3 and the upper end surface 6. The inner elongated bore 4 then need not be formed, and only a centering bore may suffice.

Figure 6:
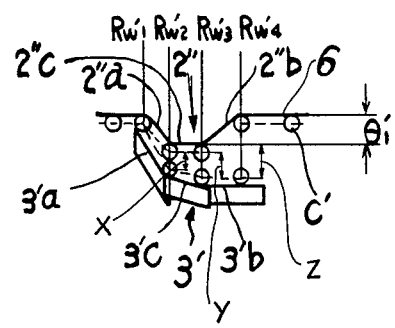
FIG. 6 is a developed diagram of the control edges of the piston of FIG. 5.
Figure 7:
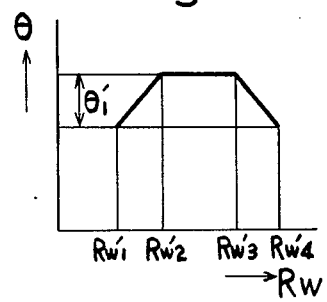
FIG. 7 is an injection timing diagram of the piston of FIG. 5 and having the developed control edges of FIG. 6.

FIGS. 6 and 7 illustrate the timing of the ignition instant, similar to FIGS. 2 and 3, with respect to the piston of FIG. 5. Same elements have been given the same reference numerals, with single and double prime notation where appropriate. The position Rw'4 corresponds to the end position of the right side cut of the notch 2", or the groove 3', respectively, as clearly apparent from FIGS. 6 and 7.

The manufacturing method of the piston is characterized by forming the notch or groove in the upper end surface of the piston by a suitable tool having a circumferential shape similar to the cut to be made. This tool may be a milling cutter, a grinding disc, or the like, and the upper end surface of the piston is worked in a single working step (which may encompass a few passes of the tool). Further, a centering bore is formed in the upper part of the piston to serve as a holding bore for a mandrel, or other holding element when the outer circumference of the piston is to be ground, lapped, or polished.

Figure 8:
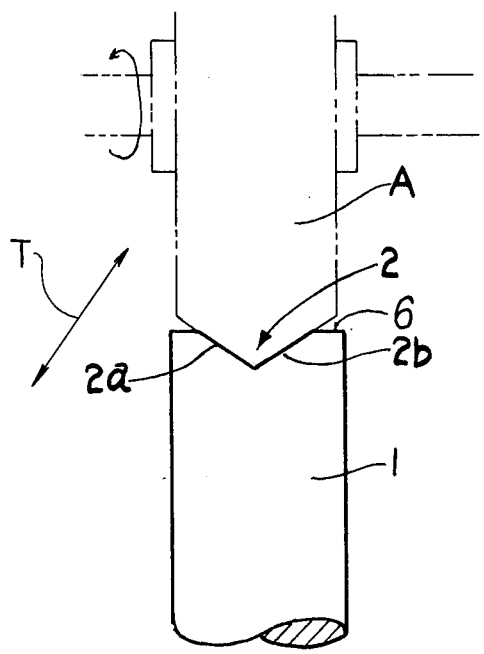
Figure 9:
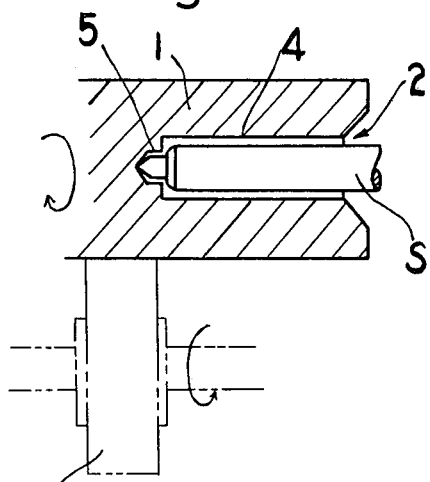

The working steps to make the pistons of the embodiments of FIGS. 1, 4 or 5 are all similar, and will be explained in detail in connection with a piston of FIG. 1: As seen in FIG. 8, the cut 2 in the upper end surface 6 of the piston 1 is formed by a suitable cutting tool A passing transversely across the upper end surface. This cutting tool, which is a shaped milling cutter, a shaped grinding disc, or the like, forms the two control edge portions 2a, 2b in one manufacturing step. The outer edge of the cutting tool has an inverted V-shape. A preferably rotary cutting tool A is fed in a direction vertical to the plane of the paper, as indicated by the arrow T (taken in perspective). A large number of pistons may be aligned in a row, one behind the other, and pistons, or cutting tool are fed vertically with respect to each other with a suitable feeding speed. This permits inexpensive serial mass production. The longitudinal bore 4, and the centering bore 5, can be made in the piston before, or after the cut 2 is made by means of the tool A. The cut forming the groove 3 is made in a known manner and may be made in the piston before or after the cut 2 is made. Final working includes an outer grinding or polishing step of the outer circumference of the piston 1 for finishing the surface thereof. For grinding the circumference, the piston is held by a centering bolt S (FIG. 9) engaging the centering bore 5 of the piston. A circumferential grinding wheel B engages the surface of the piston.

Figure 10:
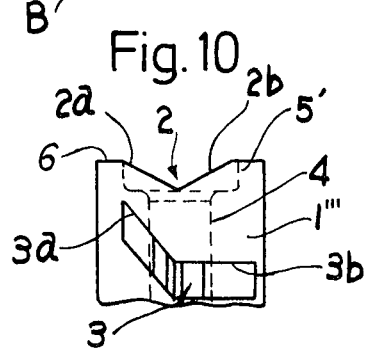
FIG. 10 is a schematic fragmentary side view of another embodiment of the piston having the control surfaces of FIG. 1.

The centering bore need not be formed in the base of the longitudinal bore 4 drilled into the piston to form a fuel communication channel or duct; it can be worked into the upper end surface 6, as schematically seen in FIG. 10, where a wider centering area 5' is bored. This embodiment is particularly suitable for pistons 1''' of slightly larger diameter and where sufficient room is available to provide an accurately centered bore leaving sufficient material in view of strength requirements.

By suitably shaping the outer circumference of the cutting tool A (FIG. 8), the shape of the notch or groove 2 cut into the upper end surface 6 can be easily changed, and thus any desired profile of the control edge 2a, 2b can be readily obtained. In addition, the cut or groove 2 need not occur in a continuous process but can consist of an approach of the cutting tool from the exterior in the direction of the piston axis by some predetermined amount or again, by an obliquely upward advance of the tool with the result of achieving a form of the cut as shown, for example, by the cut 2' in FIG. 4.

Various changes and modifications may be made within the scope of the inventive concept, and embodiments described in connection with any one of the figures of the drawings may be used, suitably, with any other embodiment described.

Further, with regard to the third embodiment shown in FIG. 5, FIG. 6 and FIG. 7, a set of example values will be desclosed below to make it more concretely. The diameter of the piston 1" is 9 mm, the diameter of the bore 4 is 4 mm, the diameter of the bore c' shown in FIG. 1 is 3.5 mm, the angle formed by the edge 2"a with the surface 6 is 23°, the angle formed by the edge 2"b with the surface 6 is 29° 30', the angle formed by the edge 3'a with the vertical axis of the piston is 47° 30', the angle formed by the edge 3'c with the same axis is 30° 10', the angle formed by the edge 3'b with the same axis is 8° 20', the length of the control edge 2"c is 0.25 mm, the distance x is 1.05 mm, the distance y is 1.2 mm, the distance z is 2.8 mm and the distance 01' is 1.25 mm.

Furthermore, the additional explanation will be made below as to FIG. 1. 9 designates a residual portion which remain after the edges 3a and 3b are formed. The groove 3 is connected with the interior of the bore 4 through two slots 7 and 8.

That which is claimed is:

1. In a fuel injection piston of a fuel injection pump for use in internal combustion engines, the piston being axially reciprocated, as well as rotated within a pump cylinder, with the pump cylinder being formed with a fuel supply opening therein, and said piston being formed with an upper end surface and with relieved portions defining an upper control edge determining initiation of fuel injection and a lower control edge determining termination of fuel injection as the edges move past said fuel supply opening, and with rotation of said piston determining the relative timing of movement of the control edges past said opening the improvement wherein:
  i. the piston is further formed with fluid communication means between said relieved portions;
  ii. the upper end surface of said piston is provided with a notch which forms at the intersection of the notch with the circumferential surface of the piston at least two upper control edge sections serving at least as a part of said upper control edge;
  iii. said two control edge sections have relatively different inclinations with respect to the lower control edge, and
  iv. one of said edge sections extends downwardly at an inclination from the upper end surface of the piston, and the other of said edge sections extends upwardly from the bottom of said one edge section in a direction opposite the direction of inclination of said one edge section and towards the upper end surface of the piston.

2. The piston according to claim 1, wherein the two edge sections have relatively different inclinations from the lowest point thereof to the upper end surface of the piston to form inclined surfaces which are non-symmetrical with respect to the axis of the piston and provide said relatively differently inclined edge sections.

3. The piston according to claim 1, wherein the notch has a first control edge section extending downwardly at an inclination from the upper end surface of the piston;
  a second control edge section extending upwardly from the base of the notch in a direction opposite to the inclination of said first control edge section, and towards the upper end surface of the piston; and
  a third control edge section extending at the base of the notch and essentially parallel to the upper end surface of the piston and connecting the first and second control edge sections.

4. The piston according to claim 1, wherein the piston is formed with a lower notch formed in the circumference of the piston, and wherein the intersection of said lower notch with the circumferential surface of the piston forms the lower control edge.

5. The piston according to claim 4, wherein the lower notch is inclined with respect to the axis of the piston and formed with at least two different zones of inclination.

6. The piston according to claim 5, wherein the inclined sections of the lower notch have directions of inclination corresponding to those of the inclination of the sections of the notch extending from the upper end surface of the piston.

7. The piston according to claim 1, wherein the notch extends across the face of the piston.

8. The piston according to claim 1, wherein the notch is cut into a portion of the upper end surface of the piston.

9. The piston according to claim 1, wherein the piston is further formed with means within said fluid communication means for use in securing said piston during manufacture thereof.

10. In a fuel injection piston of a fuel injection pump for use in internal combustion engines, the piston being axially reciprocated, as well as rotated within a pump cylinder, with the pump cylinder being formed with a fuel supply opening therein, and said piston being formed with an upper end surface and with relieved portions defining an upper control edge determining initiation of fuel injection and a lower control edge determining termination of fuel injection as the edges move past said fuel supply opening, and with rotation of said piston determining the relative timing of movement of the control edges past said opening, the improvement wherein:
  i. the piston is further formed with fluid communication means between said relieved portions;
  ii. the upper end surface of said piston is provided with a notch which forms at the intersection of the notch with the circumferential surface of the piston at least two upper control edge sections serving at least as a part of said upper control edge;
  iii. said two control edge sections have relatively different inclinations with respect to the lower control edge;
  iv. wherein the notch has a first control edge section extending downwardly at an inclination from the upper end surface of the piston;
  v. a second control edge section extending upwardly from the base of the notch in a direction opposite to the inclination of said first control edge section, and towards the upper end surface of the piston; and
  vi. a third control edge section extending at the base of the notch and essentially parallel to the upper end surface of the piston and connecting the first and second control edge sections.

11. In a fuel injection piston of a fuel injection pump for use in internal combustion engines, the piston being axially reciprocated, as well as rotated within a pump cylinder, with the pump cylinder being formed with a fuel supply opening therein, and said piston being formed with an upper end surface and with relieved portions defining an upper control edge determining initiation of fuel injection and a lower control edge determining termination of fuel injection as the edges move past said fuel supply opening, and with rotation of said piston determining the relative timing of movement of the control edges past said opening, the improvement wherein:
  i. the piston is further formed with fluid communication means between said relieved portions;
  ii. the upper end surface of said piston is provided with a notch which forms at the intersection of the notch with the circumferential surface of the piston at least two upper control edge sections serving at least as a part of said upper control edge;
  iii. said two control edge sections have relatively different inclinations with respect to the lower control edge;
  iv. wherein the piston is formed with a lower notch formed in the circumference of the piston, and wherein the intersection of said lower notch with the circumferential surface of the piston forms the lower control edge;
  v. wherein the lower notch is inclined with respect to the axis of the piston and formed with at least two different zones of inclination; and
  vi. wherein the inclined sections of the lower notch have directions of inclination corresponding to those of the inclination of the sections of the notch extending from the upper end surface of the piston.

* * * * *